US012119584B2

(12) United States Patent
Wagner et al.

(10) Patent No.: US 12,119,584 B2
(45) Date of Patent: Oct. 15, 2024

(54) DOMESTIC APPLIANCE HAVING AT LEAST ONE PLUG FOR AN ELECTRICAL CONNECTION

(71) Applicant: BSH Hausgeräte GmbH, Munich (DE)

(72) Inventors: Sebastian Wagner, Glött (DE); Michael Wagner, Glött (DE); Sebastian Reitenauer, Dillingen (DE)

(73) Assignee: BSH Hausgeräte GmbH, Munich (DE)

(*) Notice: Subject to any disclaimer, the term of this patent is extended or adjusted under 35 U.S.C. 154(b) by 0 days.

(21) Appl. No.: 18/230,703

(22) Filed: Aug. 7, 2023

(65) Prior Publication Data

US 2023/0387624 A1 Nov. 30, 2023

Related U.S. Application Data

(63) Continuation of application No. 17/489,830, filed on Sep. 30, 2021, now Pat. No. 11,764,512, which is a (Continued)

(30) Foreign Application Priority Data

May 22, 2017 (DE) ..................... 10 2017 208 650.5

(51) Int. Cl.

*H01R 13/506* (2006.01)
*A47L 15/42* (2006.01)

(Continued)

(52) U.S. Cl.

CPC ........ *H01R 13/506* (2013.01); *A47L 15/4274* (2013.01); *H01R 13/502* (2013.01);

(Continued)

(58) Field of Classification Search

CPC ................ H01R 13/502; H01R 13/506; H01R 13/5213; H01R 13/527; H01R 2103/00;

(Continued)

(56) References Cited

U.S. PATENT DOCUMENTS 3,836,944 A * 9/1974 Lawson .............. H01R 4/2433 439/402
5,661,352 A * 8/1997 Oguchi ................. H02K 5/225 310/71

(Continued)

FOREIGN PATENT DOCUMENTS

DE 102010042545 A1 4/2012
DE 102014222553 A1 5/2016

(Continued)

OTHER PUBLICATIONS

International Search Report PCT/EP2018/061653 dated Jul. 19, 2018.

*Primary Examiner* — Abdullah A Riyami
*Assistant Examiner* — Thang H Nguyen
(74) *Attorney, Agent, or Firm* — Michael E. Tschupp; Brandon G. Braun; Andre Pallapies

(57) ABSTRACT

A flexibly deformable chain that includes connectors for electrical contacting. Each of the connectors can include a first component in which electrically conductive contacts can be retained. The first component can be made from a fire-retardant plastic. Additionally, a second component can allow mechanical connection of each of the connectors in the flexibly deformable chain. The second component can have an ignition point which is lower than an ignition point of the first component and the second component can have an elasticity which is greater than an elasticity of the first component.

16 Claims, 3 Drawing Sheets

Related U.S. Application Data continuation of application No. 16/603,871, filed as application No. PCT/EP2018/061653 on May 7, 2018, now Pat. No. 11,205,871.

(51) Int. Cl.

| | |
|---|---|
| ***H01R 13/502*** | (2006.01) |
| ***H01R 13/527*** | (2006.01) |
| *D06F 34/30* | (2020.01) |
| *D06F 37/42* | (2006.01) |

(52) U.S. Cl.

CPC .......... *H01R 13/527* (2013.01); *D06F 34/30* (2020.02); *D06F 37/42* (2013.01)

(58) Field of Classification Search

CPC ......... H01R 24/28; D06F 34/30; D06F 37/42; A47L 15/4274

See application file for complete search history.

(56) References Cited

U.S. PATENT DOCUMENTS

| | | | | |
|---|---|---|---|---|
| 5,934,076 | A * | 8/1999 | Coney | F02G 1/044 60/617 |
| 5,997,342 | A * | 12/1999 | Suzuki | H01R 13/641 439/372 |
| 7,121,847 | B1 * | 10/2006 | Jetton | H01R 13/527 439/76.2 |
| 8,858,258 | B2 * | 10/2014 | Stokowski | H01R 13/533 439/582 |
| 9,991,622 | B2 | 6/2018 | Kono et al. | |
| 2005/0142912 | A1 | 6/2005 | Shigeta et al. | |
| 2005/0197010 | A1 | 9/2005 | Ching | |
| 2006/0110986 | A1 * | 5/2006 | King | H01R 4/62 439/709 |
| 2007/0049073 | A1 * | 3/2007 | Hill | H01R 4/646 439/98 |
| 2009/0239408 | A1 * | 9/2009 | Sacher | H01R 4/28 439/376 |
| 2011/0076162 | A1 * | 3/2011 | Heidecker | H01R 13/5219 417/313 |
| 2014/0322994 | A1 * | 10/2014 | Keeven | H01R 13/03 439/886 |
| 2015/0249310 | A1 * | 9/2015 | Mclaughlin | H01R 25/003 439/652 |
| 2018/0160880 | A1 * | 6/2018 | Dabade | A47L 15/4246 |

FOREIGN PATENT DOCUMENTS

| | | | |
|---|---|---|---|
| JP | 2002203635 | A | 7/2002 |
| JP | 2012000354 | A | 1/2012 |
| JP | 2015210953 | A | 11/2015 |
| WO | 2018077634 | A1 | 5/2018 |

* cited by examiner

DOMESTIC APPLIANCE HAVING AT LEAST ONE PLUG FOR AN ELECTRICAL CONNECTION

CROSS-REFERENCES TO RELATED APPLICATIONS

This application is a Continuation Application of U.S. patent application Ser. No. 17/489,830, filed Sep. 30, 2021, which is a continuation of Ser. No. 16/603,871, now U.S. Pat. No. 11,205,871, which is a U.S. National Stage of International Application No. PCT/EP2018/061653, filed May 7, 2018, which designated the United States and has been published as International Publication No. WO 2018/215191 A1, and which claims priority to German Patent Application, Serial No. 10 2017 208 650.5, filed May 22, 2017, pursuant to 35 U.S.C. 119(a)-(d).

BACKGROUND OF THE INVENTION

The present invention relates to a household appliance, in particular a household dishwasher, having at least one plug connector for electrical contacting, wherein the connector comprises a body for mechanically retaining one or more electrically conductive contact(s), which are accessible on at least one exit side for contacting.

It is known to provide electrical plug-in connections on or in household appliances directly (on a circuit board) or indirectly (by interposing a baseplate or socket), which in particular can also contact various component groups in the household appliance.

When these plug-in connections carry high power and high current strengths, there is a certain risk that a fault could result in a fire in the connector, which could also affect surrounding component groups.

Attempts are therefore made to protect for as long as possible surrounding component groups or other components, such as surrounding furniture, textiles or the like, from damage caused by overheating occurring in the connector.

A new test, known as the Nichrome Wire Test, has been introduced for this purpose in the USA in particular, which subjects plug-in connections to very high temperatures of approx. 1200° C. A previously common material for connectors is not suitable for meeting the stringent fire safety requirements because this material does not ensure that the connector's surroundings will be protected from fire. The aforementioned test is consequently not passed.

The problem underlying the invention is to protect, as effectively as possible, components and parts located close to an electrical plug-in connection from a fire occurring in the connector, while continuing to allow mechanical properties that can be achieved using flexible materials.

BRIEF SUMMARY OF THE INVENTION

On the one hand, the invention achieves a high degree of fire safety that allows the new standard referred to above to be met, by, in the case of a generic household appliance, with at least one connector for electrical contacting, the body for mechanically retaining one or more electrically conductive contact(s) being constructed from at least two components, of which a first component comprising the exit side is made from a fire-retardant plastic. On the other hand, however, as a result of the at least one further component of the connector, mechanical properties remain possible that would not be possible with a construction from fire-retardant material only, such as a flexibly movable chaining-together of multiple connectors, which is highly favorable for fully automatic production and allows the continued use of existing automated production equipment.

"Non-flammable" refers here to flammability classes and standards, such as UL 94 referred to in greater detail below.

A second component can then have a lower ignition point and a greater elasticity compared with the first component, in order to realize the desired mechanical advantages. The second component can be flexibly deformable as a result of its elasticity. Further components, such as a third or fourth component, can additionally be possible.

Particularly favorably, the first component takes up the main share of the volume of the connector, so that the aspect of fire safety plays a particularly significant role and very strict fire safety standards such as the Nichrome Wire Test, which is mandatory in the USA from 2019 on, can be met. In particular, more than 80% of the connector's volume is made up of the first component.

A mechanically simple and effective solution provides that the part of the connector made up of the second component is latched onto the part of the connector made up of the first component. For this purpose, the material of the second component has a high degree of elastic bendability.

Furthermore the second component can be provided for a mechanical connection of multiple connectors in order to create an easy-to-handle, chain-like assembly comprising multiple connectors, which can be fed into automated production equipment in order to produce cable harnesses, wherein the chains can be separated at any desired points between connectors connected in this way.

Created in this way in particular, this chain of connectors by means of the second component can also be bent and/or twisted against itself. In particular, the connector can then also form what is known as a group connector. Fully automatic handling remains possible.

Likewise the second component can in each case also comprise at least one locking latch in order to ensure its mechanically safe retention on the first component and/or on a baseplate into which the connector can be plugged.

This second component can be made from a standard plastic without additional fire protection in the material. For example, the second component can be made from Schulamid, which is well-known for its handling and exhibits adequate flexibility.

Favorably the connector can be connected internally in the household appliance, for example at the contact with a heat pump (also called a heating pump) located in the appliance. In a limited space of this type too, in which many physical units are located in the close vicinity of the plug-in connection, the first component can have a positive effect in order to protect this close vicinity.

The use of the invention is of great benefit especially if currents with current strengths of more than 2 amperes will be conducted through such a plug-in connection. Tighter testing of electrical connections of this type is now performed under what is known as the Nichrome Glow Wire Test according to UL's standard 749 revision 10, in which the safety of the connection even where a significant heat build-up may occur must be evidenced.

In particular, the melting point of the material of the first component exceeds 260° C. so that this material can withstand high temperatures for a long time.

Furthermore, it is particularly favorable if the material of the first component is in flammability class V-0 under the test standard UL94.

The material of the first component favorably also has a dielectric strength of more than 240 V so that it can be used not only for low voltages, but also for mains voltages and terminals carrying more than 60 watts, as well as several hundred watts or in the kW range.

High mechanical strength as well as an increase in the ignition point of the connector is achieved if the material of the first component is fiber-reinforced with, in particular, glass fibers and/or mineral fibers.

For example, Fortron 4665 B6 may be suitable as the material of the first component. Other similarly fire-resistant plastics may also be used.

In order to provide good mechanical safety, the connector can be retained in an installed position in a form-fit manner on a baseplate into which at least the contacts of the connector can be pushed, and can engage behind an edge or cut-out of this baseplate by means of locking latches.

For example, the connector is a typical, standard Rast 2.5, Rast 3 or Rast 5 connector.

All manufacturers of Rast connectors can use the invention as standard.

Further advantages and features of the invention are disclosed in the exemplary embodiments of the subject matter of the invention shown in the drawing and described below.

DETAILED DESCRIPTION OF EXEMPLARY EMBODIMENTS OF THE PRESENT INVENTION

Figure 1:
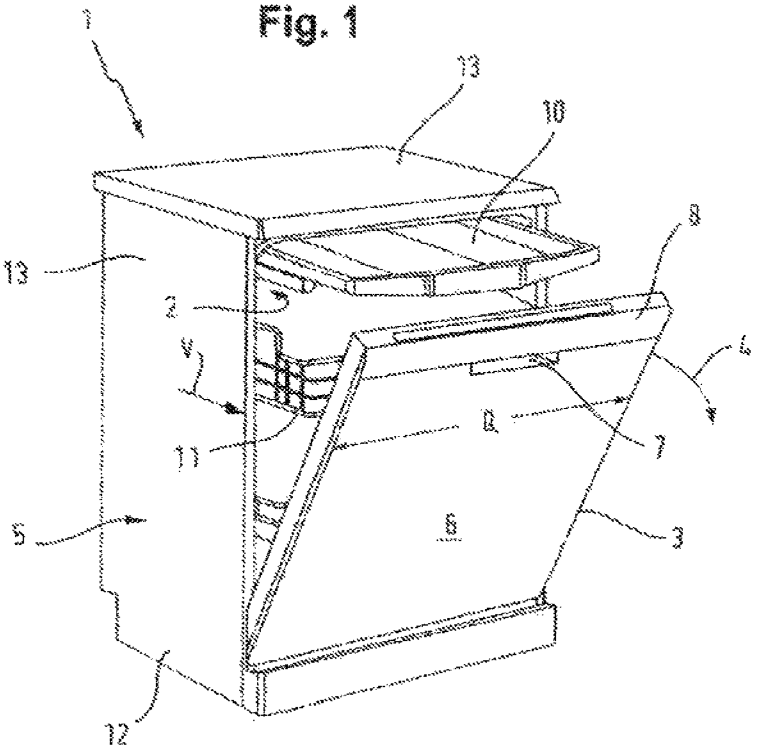
FIG. 1 shows a schematic perspective view obliquely from the front of an embodiment of a household appliance, here for example a dishwasher, in this case having a door on the front side.

The dishwasher schematically represented in FIG. 1 is a household dishwasher. Other household appliances 1, such as washing machines, tumble dryers, ovens or the like are also suitable. The dishwasher drawn here has, as an element of an appliance body 5 which is partially open to the outside or closed, a dishwasher cavity 2 for receiving items to be washed such as dishes, pots, cutlery, glasses, cooking utensils and the like. Here, the items to be washed can be stackable for example in baskets 11 and/or a cutlery drawer 10 and what is known as washing liquor can be applicable thereto. Washing liquor is understood here to mean fresh water or in particular water circulating during operation with or without detergent and/or rinse aid and/or desiccant. The dishwasher cavity 2 can have an at least essentially rectangular floor plan with a front side V facing toward the user in the operating position. Here, this front side V can form a part of a kitchen front comprising kitchen units arranged side by side, or in the case of a free-standing appliance, can also be unrelated to further units.

The dishwasher cavity 2 is closable by means of a door 3, in particular on this front side V. This door 3 is shown in FIG. 1 in a partially open position, in which it is then slanted with respect to the vertical. In its closed position, on the other hand, it stands upright and is pivotable forward and downward about a lower horizontal axis in the direction of the arrow 4 according to the drawing, so that it lies at least almost horizontal in the fully opened position.

On its outer and front side V which is vertical in the closed position and faces toward the user, the door 3 can be provided with a décor panel 6 in order thus to undergo a visual and/or haptic enhancement and/or an adaptation to surrounding kitchen units.

The household appliance 1 is embodied in this case as a free-standing or what is known as a partly integrated or fully integrated appliance. In the latter case, the appliance body 5 can also close essentially with the outer walls of the dishwasher cavity 2. A housing surrounding the latter on the outside can then be dispensed with. A base 12 for receiving in particular functional elements, such as e.g. a pump or in particular a heat or heating pump 14 as described in more detail below, can be disposed in the lower region of the dishwasher.

In the exemplary embodiment according to the drawing, a control panel 8 extending in the transverse direction Q of the dishwasher is associated with the movable door 3 in its upper region, which control panel can comprise an access opening 7 accessible from the front side V for manually opening and/or closing the door 3. In the transverse direction Q, the dishwasher often has an extent of 45, 50 or 60 centimeters. Viewed rearward in the depth direction from the front side V, the extent often also amounts to approximately 60 centimeters. The values are not mandatory.

When the door 3 is closed, the dishwasher cavity 2 is delimited circumferentially by four vertical walls 13 and two horizontal walls 13 in total, of which one forms a ceiling and a further one forms a floor of the dishwasher cavity 2.

The household appliance 1, in this case the household dishwasher drawn, has at least one connector 15 for electrical contacting (multiple connectors are also possible).

Figure 2:
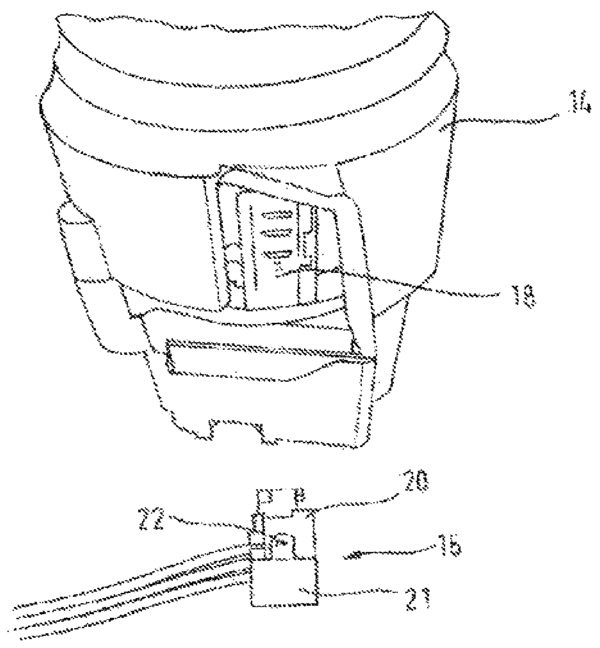
FIG. 2 shows an exploded representation of a heat pump with a baseplate for electrical contacting thereon, and a single connector not yet connected.
Figure 3:
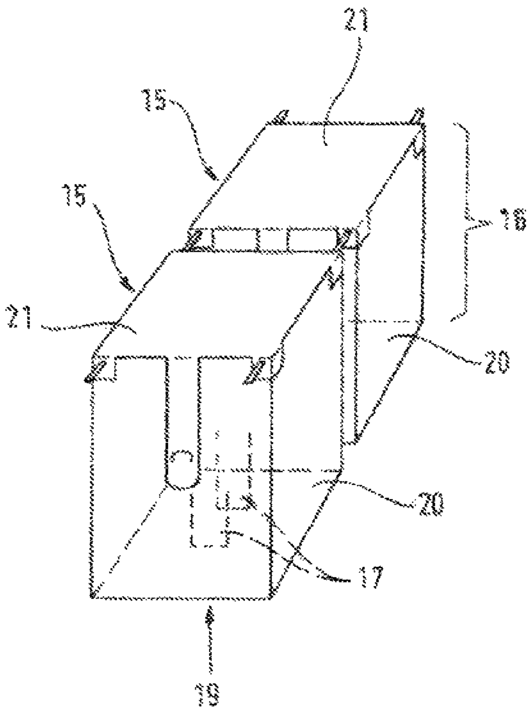
FIG. 3 shows a perspective single-component view of two connectors chained together by means of the second component, in each case with their exit side pointing down so that the second component covers the upper part of the body.

In FIG. 2 a connector 15 for contacting the heat pump 14 is drawn, for example, wherein the connector 15 comprises a body 16 for mechanically retaining one or more electrically conductive contact(s) 17 and is able to be connected to, in this case for example, a baseplate or socket 18 as a counterpart. The contacting can be performed either indirectly, as in this case, or also directly. The contacts 17 can be realized as springs or tabs, for example. The number of contacts 17 can also differ according to the requirements. The baseplate or socket 18 can be arranged in this case in a fixed manner on the housing of the heat pump 14, as shown in FIG. 2. In this case the connector 15 is therefore connected internally in the household appliance 1. In principle an external connection is also possible. The number of connectors 15 of this type on a household appliance 1 can differ.

The or each connector 15 can itself each comprise a body 16 for mechanically retaining one or more electrically conductive contact(s) 17. The connectors themselves can be standardized as what are known as Rast connectors, for example as Rast 2.5 connectors with a gap between the contacts 17 of 2.5 millimeters, or as Rast 5 connectors with a gap between the contacts 17 of five millimeters. The contacts 17 are accessible for electrical contacting purposes via at least one side, identified in this case as the exit side 19. Because the shape of the connector can differ, the “exit side” also need not represent a two-dimensional surface.

The body 16 is made up of at least two different components 20, 21. Of these, a first component 20 comprising the exit side 19 is made from a fire-retardant plastic. Fire-retardant plastic means that it is not flammable or at least has a very high ignition point.

In contrast, a second component 21 can have a lower ignition point compared with the first component, and the mechanical properties are very different to those of the first component 20. The second component 21 has a greater elasticity and can therefore allow for example a latching of the connectors 15 and/or their chaining-together, which would not be possible with a construction from fire-retardant material only.

Here the first component 20 for ensuring fire safety takes up the main share of the volume of the connector 15, for example 80% to 90%.

Here the melting point of the material of the first component 20 exceeds 260° C., in particular exceeds 280° C. In addition, ideally the material of the first component 20 is in flammability class V-0 under the test standard UL94. If used on connectors 16 for mains voltages, it is likewise favorable if the material of the first component 20 retaining the contacts 17 has a dielectric strength of more than 240 V, in particular—as is the case here—more than 250 V.

In order to meet all these requirements as well as achieve high mechanical strength, the material of the first component 20 can be fiber-reinforced with, in particular, glass fibers and/or mineral fibers. For example, the material of the protective cover can be Fortron 4665 B6, as offered by Ticona, for instance. The material has a very high RTI (relative thermal index, an indicator of flame resistance), and so it is well suited for the application required in this case. At the same time, however, it is very hard and almost glass-like, and so combining it with at least one further component 21 on the body 16 significantly extends the latter's mechanical possibilities.

Similar to a cover, the part of the connector 15 made up of the second component 21 can be fixed opposite the exit side 19 onto the part of the connector made up of the first component 20. For example, the part made up of the second component 21 is latched onto the part of the connector 15 made up of the first component 20. This type of retention is possible because the material of the second component 21 exhibits high elasticity and therefore flexible and reversible deformability. Another connection of the first 20 and second component 21 is also possible, for example bonding or welding. Integral manufacturing of both components 20, 21 in a 2K process can also be possible.

Particularly favorably, in this case the second component 21 is provided for a mechanical connection of multiple connectors 15 and extends in the manner of a cover over multiple connectors 15 in order to form a flexibly deformable chain. In this chained arrangement, the connectors can be fed into conventional automated equipment for assembly with cables, without new automated production equipment being necessary. The production of the completed cable harnesses can therefore be carried out very inexpensively and reliably. It is possible to lengthen the chain at any point between two connectors 15, and so the length of the chain can be adjusted according to the requirements and at various points in time during production. Cutting through the chain is possible with little force.

Alongside this chaining function, by means of the flexible second component 21, the part of the connector 15 made up of the second component 21 can in addition or alternatively comprise respectively one or more locking latches 22 with which it can be retained on the first component 20 or with which the connector 15 as a whole can be retained on a baseplate 18 or similar counterpart for the contacts 17 in a connected position. In particular, provided on a single connector 15 and positioned opposite each other are two locking latches 22 made from the material of the second component 21.

Here the second component 21 can be made from a standard plastic such as Schulamid or Ultramid or also another thermoplastic with corresponding elastic mechanical properties. The second component need not be subject to particular requirements in respect of fire safety.

In particular, for the purpose of meeting the aforementioned test requirements, it has to be assumed that the overheating occurs in the vicinity of the connector 15 and its electrical contacts 17 and that surrounding components therefore have to be shielded from this overheating. However the first component 20 comprising the contacts 17 performs this function.

The connector 15 itself can be made up of, for example, a standard Rast 3 or Rast 5 connector (or other connector types). The effort required to modify the existing system in order to accommodate the cover-like second component 21 is low; in particular, it remains possible for multiple connectors 15 in a chained-together arrangement to be fed into the automated assembly equipment, which itself need not be modified for the new connector type optimized for fire safety.

The connector 15 in accordance with the invention can be used inter alia as standard for all types of RAST connector and therefore also incorporated into the ZVEI working group and the RAST working group. For example, RAST 2.5 connectors, Rast 2.5 Power connectors, Rast 2.5 Plus connectors or Rast 5 connectors can be embodied in accordance with the invention.

No additional parts need to be used, and apart from the addition of the at least one second component 21, no other design measures are necessary either.

Preserving the RAST standard also preserves supplier diversity and general applicability. Changes to the production method and to dimensions and other standards are minimized. In particular, the automated production equipment need not be modified.

The high share taken up by the first component 20 and the gap between the second component 21 and the exit side 19 mean that the fire safety is good enough to pass the aforementioned test and the first component neither melts nor catches fire even at the high temperature.

However, even though the first component 20 passes the Nichrome Wire Test, all the conditions for optimized assembly (chaining of connectors 15, fully automatic handling, locking latches 22) are preserved with the second component 21.

The invention claimed is:

1. A flexibly deformable chain comprising:

a plurality of connectors for electrical contacting, each connector of the plurality of connectors comprising:

a first component in which at least one electrically conductive contact is retained, the first component being made from a fire-retardant plastic, and the first component at least substantially forming an exit side of each connector of the plurality of connectors; and a second component coupled with the first component opposite to the exit side and configured to allow mechanical connection of each connector of the plurality of connectors, the second component having an ignition point which is lower than an ignition point of the first component, and the second component having an elasticity which is greater than an elasticity of the first component.

2. The flexibly deformable chain of claim 1, wherein the second component is configured to allow the mechanical connection of each connector of the plurality of connectors by extending as a cover over each connector of the plurality of connectors.

3. The flexibly deformable chain of claim 1, wherein the at least one electrically conductive contact of each connector of the plurality of connectors is accessible on the exit side.

4. The flexibly deformable chain of claim 1, wherein the second component of each connector of the plurality of connectors is coupled with the first component of each connector of the plurality of connectors by being latched onto the first component.

5. The flexibly deformable chain of claim 1, wherein the second component comprises a plurality of locking latches, and wherein the plurality of locking latches are configured to couple the first component of each connector of the plurality of connectors with the second component.

6. The flexibly deformable chain of claim 1, wherein the second component comprises a plurality of locking latches, and wherein at least one locking latch of the plurality of locking latches is configured to retain at least one connector of the plurality of connectors in an installed position in a form-fit manner on a base plate of a pump into which the at least one electrically conductive contact of the at least one connector of the plurality of connectors is insertable.

7. The flexibly deformable chain of claim 1, wherein the second component is made from a standard plastic.

8. The flexibly deformable chain of claim 1, wherein the second component is made from Schulamid.

9. The flexibly deformable chain of claim 1, wherein each connector of the plurality of connectors is configured to conduct an electric current with a current strength of more than 2 amperes.

10. The flexibly deformable chain of claim 1, wherein the first component is made of a material having a melting point which exceeds 260° C.

11. The flexibly deformable chain of claim 1, wherein the first component is made of a material which is classified in flammability class V-0 under the test standard UL94.

12. The flexibly deformable chain of claim 1, wherein the first component is made of a material which has a dielectric strength of more than 240 V.

13. The flexibly deformable chain of claim 1, wherein the first component is made of fiber-reinforced material.

14. The flexibly deformable chain of claim 13, wherein the fiber-reinforced material includes glass fibers and/or mineral fibers.

15. The flexibly deformable chain of claim 1, wherein the first component is made of Fortron 4665 B6.

16. The flexibly deformable chain of claim 1, wherein the plurality of connectors are standard Rast 2.5, Rast 3 or Rast 5 connectors.

* * * * *